Oct. 11, 1932.  G. A. UNGAR  1,882,531
CREASING AND FOLDING MACHINE
Filed Dec. 29, 1930  9 Sheets-Sheet 1
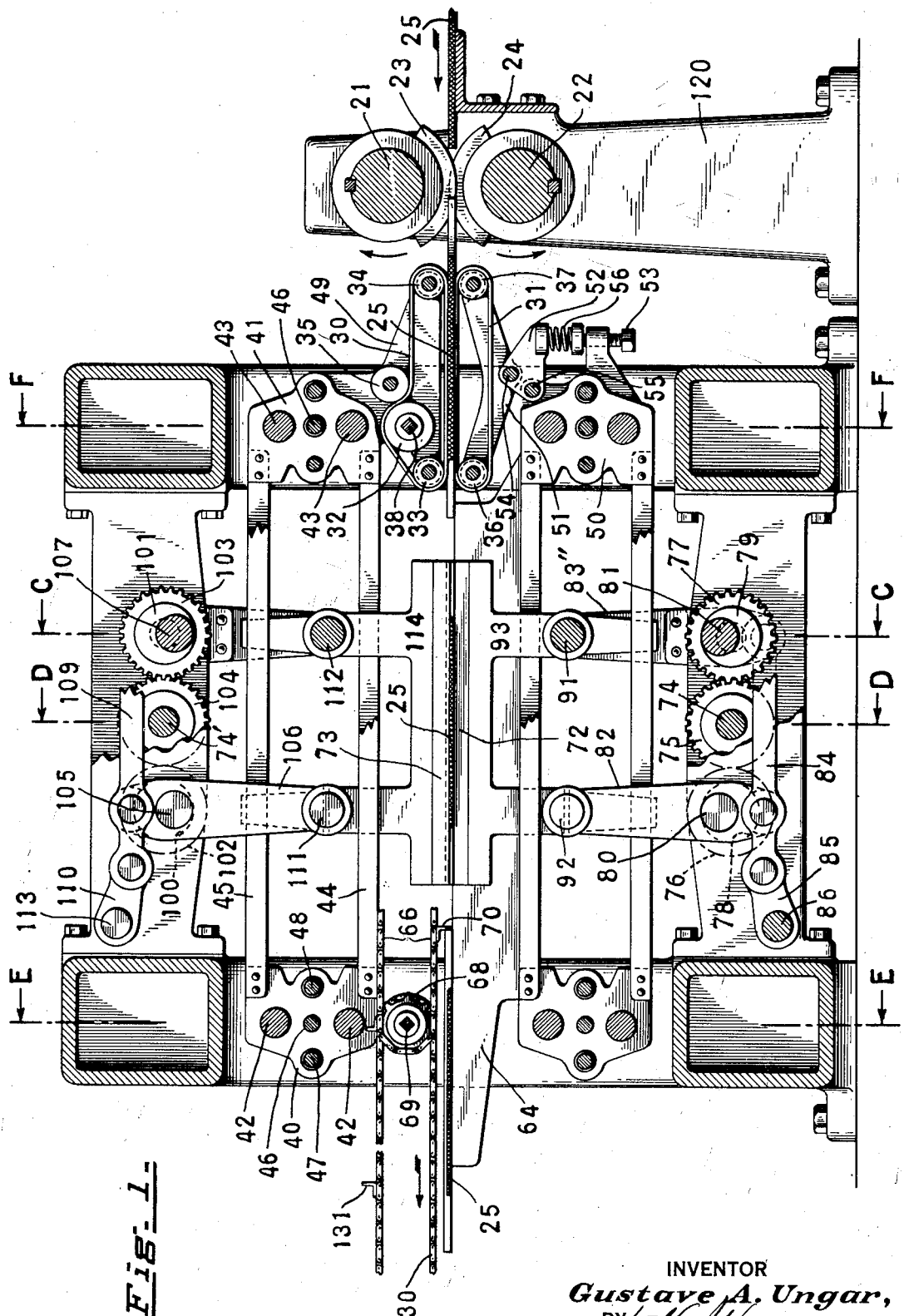
Fig. 1.
INVENTOR
Gustave A. Ungar,
BY
ATTORNEY

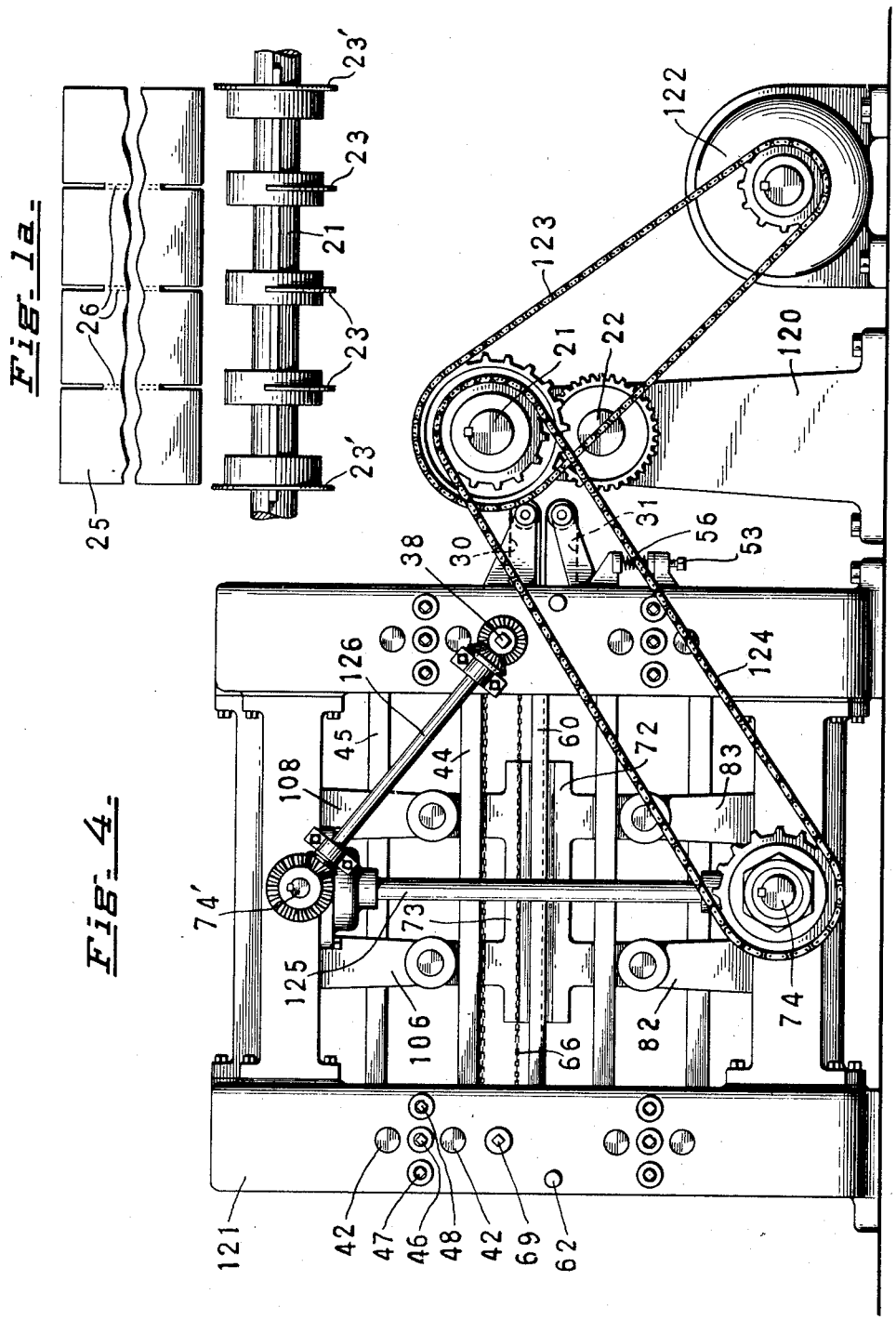

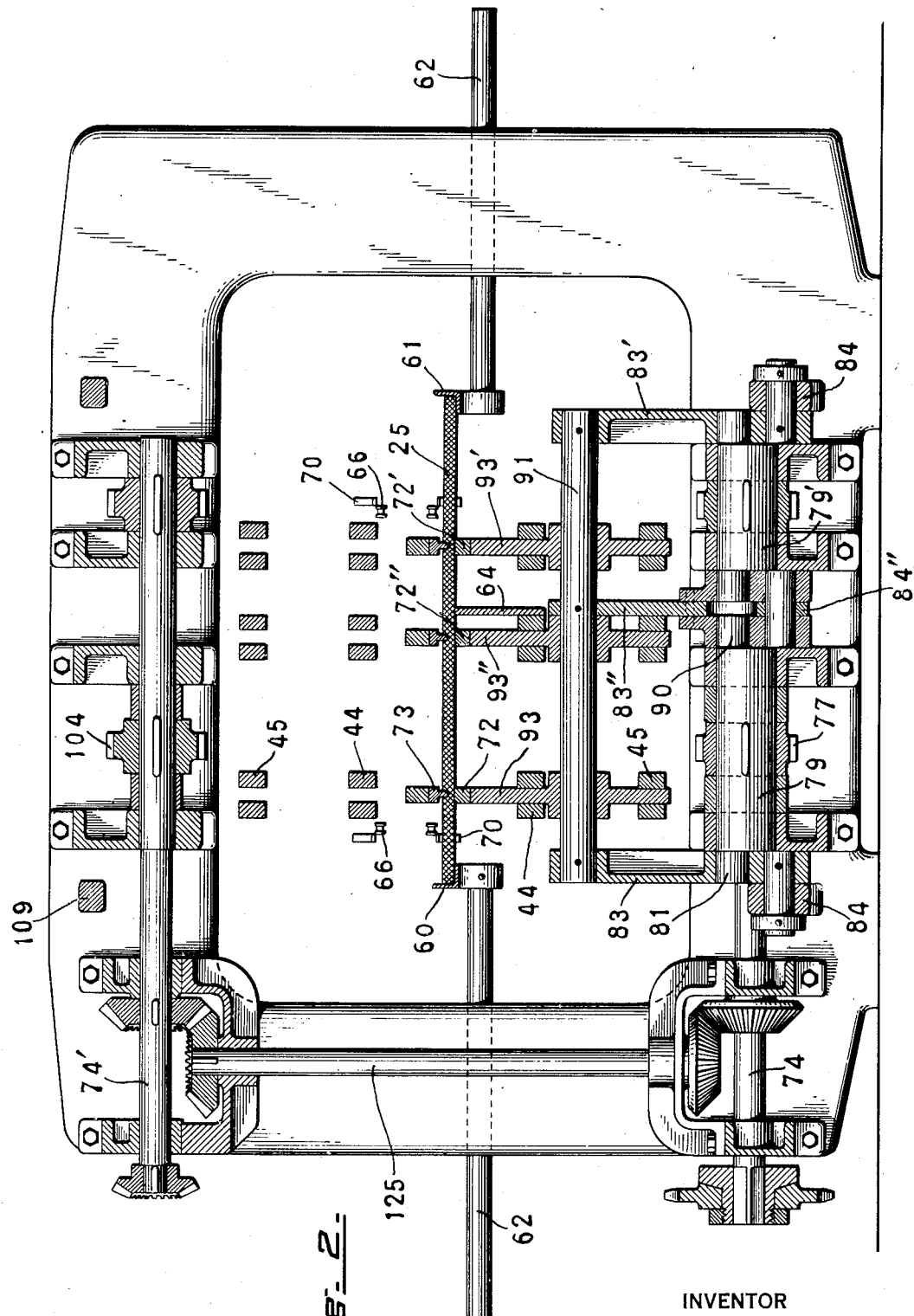

Oct. 11, 1932.  G. A. UNGAR  1,882,531
CREASING AND FOLDING MACHINE
Filed Dec. 29, 1930  9 Sheets-Sheet 4

INVENTOR
Gustave A. Ungar,
BY
ATTORNEY

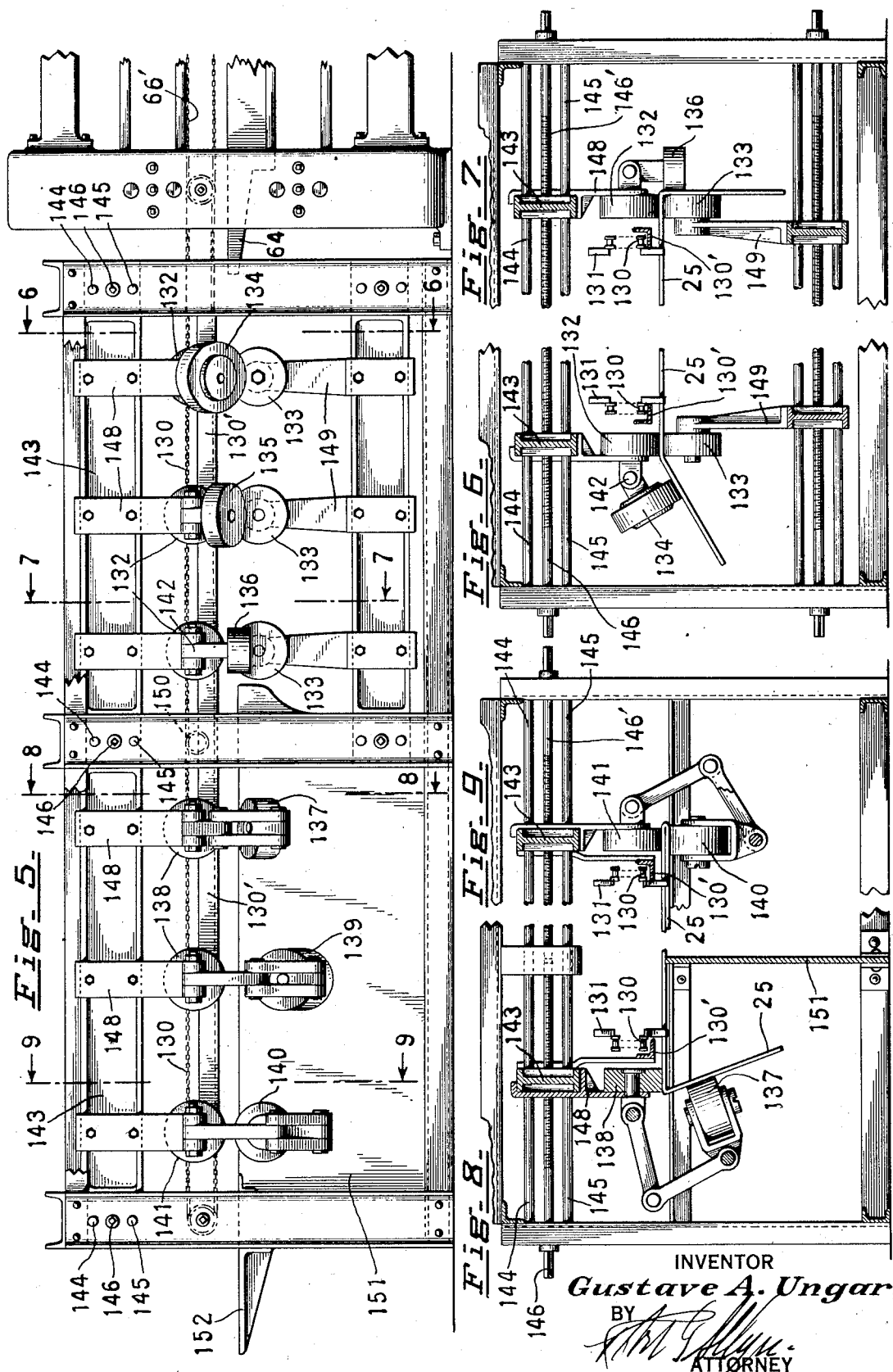

Oct. 11, 1932.  G. A. UNGAR  1,882,531
CREASING AND FOLDING MACHINE
Filed Dec. 29, 1930   9 Sheets-Sheet 6

INVENTOR
Gustave A. Ungar,
BY
ATTORNEY

Oct. 11, 1932.  G. A. UNGAR  1,882,531
CREASING AND FOLDING MACHINE
Filed Dec. 29, 1930      9 Sheets-Sheet 7

INVENTOR
Gustave A. Ungar,
BY
ATTORNEY

Oct. 11, 1932.     G. A. UNGAR     1,882,531
CREASING AND FOLDING MACHINE
Filed Dec. 29, 1930     9 Sheets-Sheet 8

INVENTOR
Gustave A. Ungar,
BY
ATTORNEY

Oct. 11, 1932. G. A. UNGAR 1,882,531
CREASING AND FOLDING MACHINE
Filed Dec. 29, 1930    9 Sheets-Sheet 9

INVENTOR
Gustave A. Ungar,
BY
Robert S. Allyn
ATTORNEY

Patented Oct. 11, 1932

1,882,531

UNITED STATES PATENT OFFICE

GUSTAVE A. UNGAR, OF PELHAM MANOR, NEW YORK

CREASING AND FOLDING MACHINE

Application filed December 29, 1930. Serial No. 505,275.

My invention relates to machines and processes for the manufacture of boxes from what is commonly termed corrugated paper. Material of this character is quite difficult to handle and especially difficult to feed with rollers because of the yielding character of the material and its tendency to work sideways in the feed rolls.

One of the objects of my invention is to provide simple and reliable mechanism for creasing corrugated box blanks in alignment with the edges of the sheet.

Another object is to accurately crease such blanks in line with the slots which have previously been made in the edges of blanks.

Another object is to provide a mechanism which can accurately slot, crease and fold such blanks.

A special object is to provide a machine for continuous operation, that is, for moving sheets continuously through the machine and subjecting them to slotting and creasing actions without stopping or slowing down their longitudinal travel through the machine.

In the drawings are shown the preferred form and certain modifications of the mechanism as typical of the possibilities of the invention.

In one form, for instance, the sheet or blank is slotted by cutters of a suitable type, such as are commonly employed in handling corrugated paper box blanks. From these slotters blanks are fed to feeding belts or chains which carry the blanks to the creasing mechanism.

This creasing mechanism consists of upper and lower sets of jaws provided with eccentrics and link mechanism by which the jaws are brought into corresponding engagement with the blanks as the blanks move forwardly and these jaws are moving forwardly with the blanks during the creasing operation and without any substantial change in the speed of the blanks as received from the slotters. At the end of the creasing stroke of the jaws, the blanks are carried away from the creasing jaws to the folding mechanism by which one or more edges of the blanks are folded while in motion.

By the use of suitable folding rolls, belts, etc. the blank can be delivered ready for taping and, in fact, the taping operation might be performed in the same machine or in a continuation thereof.

Fig. 1 is a longitudinal sectional view and side elevation showing the general construction and arrangement of the machine involved in my invention, the jaws being shown in the closed position.

Fig. 1—a is a plan view showing the slotting cutters with a fragment of a blank such as would be formed on such a machine.

Fig. 2 is a transverse sectional view shown partly on the line of the plane C—C and partly on the line of the plane D—D of Fig. 1.

Fig. 4 is a partial side view of the slotting and creasing part of the machine.

Fig. 5 is a side view of the portion of the machine for folding.

Fig. 6 is a transverse section of the folding mechanism on the plane of the line 6—6 of Fig. 5.

Fig. 7 is a transverse sectional view of the plane on the line 7—7 of Fig. 5.

Fig. 8 is a transverse sectional view on the plane of the line 8—8 of Fig. 5.

Fig. 9 is a transverse sectional view on the plane of the line 9—9 of Fig. 5.

Figure 3:
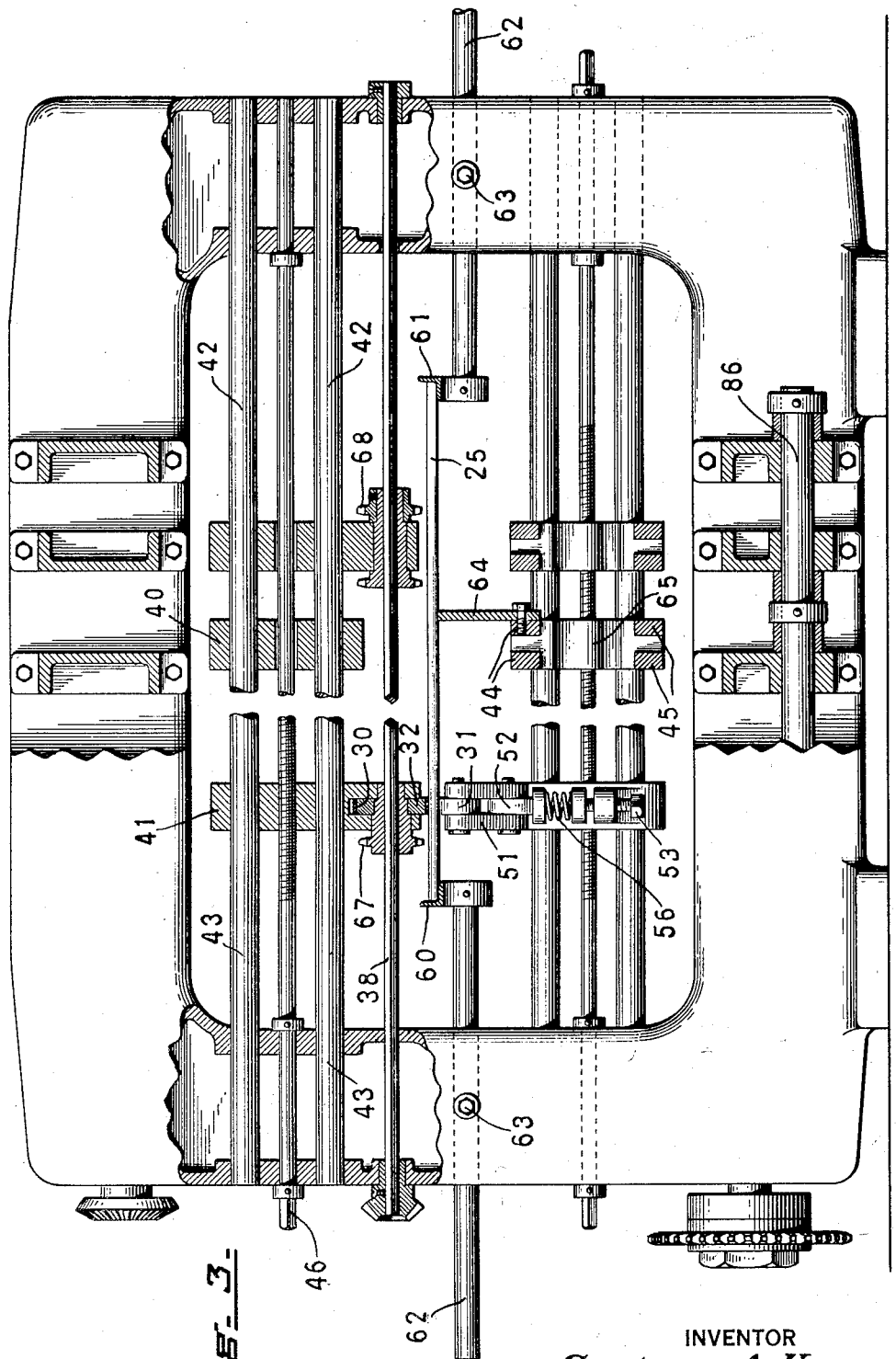
Fig. 3 is a transverse sectional view partly on the plane of the line E—E and partly on the plane of the line F—F of Fig. 1.

The slotting mechanism may be made of any suitable character, for instance, having shafts 21 and 22 with cutters 23 and 24 of the proper size and spacing. Edge cutters 23' may be provided for trimming the sides of the blanks at the same time that the cutters 23 and the corresponding lower cutters 24 are forming the necessary slots. It should be understood that these various cutters can be adjusted laterally to handle a blank of the desired width and to locate the slots at the proper spacing for the particular blank to be formed on the machine. It will be understood that such a blank 25 is formed of any suitable material and that the creases are to be formed along the lines 26 in alignment with the slots produced by the cutters 23 and 24, etc. Obviously the blanks can be of predetermined standard lengths or trimmed in the machine in any well known manner (not shown).

From the slotting rolls or devices a blank is taken by feed belts 30 and 31 arranged in pairs on opposite sides of the machine. The upper belt passes around a pulley 32 and the idlers 33 and 34 and is kept tight by a roller 35. The lower belt is guided on pulleys 36 and 37. Power to drive these belts is applied through the shaft 38 which carries the pulley 32. This shaft extends across the machine so that the parts may be adjusted laterally and driven in any position.

Preferably the belts are adjusted transversely so as to grip the blank along the lines of the outer rows of slots and thus avoid marring or smearing the blanks which are usually printed on the spaces which are to constitute the sides and ends of the boxes, which printing operation is usually performed immediately prior to the slotting. In order to facilitate this lateral adjustment of these feed belts and of the creasing mechanism, to be subsequently described, I provide sub-frames which are mounted to slide transversely in the machine. These sub-frames are formed of end pieces such as 40 and 41 guided on rods 42 and 43. These end pieces are connected by longitudinal ties 44 and 45 and lateral adjustment is effected by means of screw shafts 46, 47 and 48 for the various sub-frames. For instance, screw 46 may serve to adjust the left end sub-frame as viewed in Fig. 3 and screws 47 and 48 serve to adjust the other sub-frames respectively in a similar manner.

The pulleys or rollers 32, 33, 34 and 35 are all carried by a bracket 49 which in turn is supported at the entrance end of the upper sub-frame of the outer pair.

A similar set of laterally adjustable sub-frames is provided beneath the plane of travel of the blanks one of which is denoted by the reference number 50 and serves to carry the rollers 36 and 37 through the instrumentality of levers 51, 52 and the adjusting bolt or screw 53. The lever 51 is of the floating type pivoted at 54 to the lever 52 which in turn is pivoted at 55 to the sub-frame 50. A spring 56 is preferably interposed between the adjusting screw 53 and the outer end of the lever 52.

By means of the screw 53 the pressure of the spring 56 can be adjusted to press the levers 52 and 51 upwardly and thus produce an equal bearing pressure on both ends of the belt 31. This floating lever 51 permits the entrance end of the feed belts to open up to admit the blank and to carry the blank around by friction which is thus maintained substantially uniform throughout the feed. This construction in which small feed rolls or pulleys 34 and 37 are employed makes it possible to bring the feed belts in very close to the slotting cutters so as to be able to handle short blanks and grasp them securely and in perfectly timed relation to the holders of the creasers. The lower sub-frames such as 50 are mounted and adjusted laterally in a manner similar to the upper sub-frames previously described.

Obviously the screw shafts for adjusting the sub-frames laterally can all be connected together in any well known manner for simultaneously affecting the lateral adjustment of the respective belts, pieces and so forth. Channels 60 and 61 serve as lateral guides and supports for the edges of the blanks 25 as they pass through the machine. These channels may be supported on slides such as 62 adjustable transversely and adapted to be secured in position, for instance, by set screws 63. A central support 64 may also be provided if desired which for instance might be supported by the central lower sub-beam 65 which would usually be located in the center or fairly close to it.

Feed chains 66 are supported by each of the upper lateral sub-frames on sprockets such as 67 and 68 mounted on the shafts 38 and 69 so that they are adjustable laterally with the sub-frames. Each of these chains carries a series of transverse flanges or fingers 70 adapted to engage the rear edges of the blanks near to the outside of the outer creases. These lugs, fingers or flanges are arranged and timed so as to engage the rear edges of the blanks just before they leave the feed belts 30, 31. The surface speed of the feed belts 30, 31 and the longitudinal velocity of the feeding fingers is the same so that the blanks travel through the machine at a predetermined uniform velocity.

Figs. 1 and 2 show the general construction and arrangement of the creaser mechanism which has a lower die member 72 and an upper punch member 73. These creasing jaws are driven by shafts 74 and 74'. Shaft 74 has a gear 75 which meshes with two gears 76 and 77. The two latter gears are mounted on shafts 78 and 79. The shaft 78 has a crank pin 80 and the shaft 79 has a crank pin 81. On these crank pins are mounted levers 82 and 83 which are connected at their lower ends by a link 84. One end of this link 84 is connected to a rocker arm 85 which oscillates about the shaft 86. A duplicate set of cranks, levers and links is furnished on the opposite side of the machine and includes a lever such as 83'. A central lever 83" is also preferably provided for the purpose of distributing strains and preventing deflection or bending of the parts. This lever 83" operates on a crank pin or pins such as 90. In fact the shafts such as 78 and 79 may, if desired, be made of two parts 79 and 79', as shown in Fig. 2.

The upper ends of the levers 83 and 83' and 83" are connected by a shaft 91 and similarly the upper ends of the levers corresponding to 82 are connected by a shaft 92. These shafts 91 and 92 carry the creasing die members 72, 72' and 72", through the medium of uprights 93, 93' and 93". These uprights are guided between the tie bars corresponding to bars 44 and 45 previously described as carried by the laterally adjustable sub-frames so that the lateral adjustment of these sub-frames carries the die members as well as the lower feed chains and belts.

The upper punch members 73 are supported and driven in a similar manner from the upper part of the machine. The crank shafts 100 and 101 have gears 102 and 103 driven by the gear 104 on the shaft 74' above mentioned. Crank shaft 100 has a pin 105 which drives the lever 106 and shaft 101 has a pin 107 which drives lever 108. The upper ends of these levers 106 and 108 are connected by the link 109 which is connected to the rocker 110. The lower ends of the arms 106 and 108 are connected to shafts 111 and 112 which support the upper punch member 73. The rocker 110 oscillates about the shaft 113.

The shafts 111 and 112 carry the creasing die member 73 through the medium of uprights such as 114. These uprights are guided between the tie bars 44 and 45 previously described as carried by the laterally adjustable sub-frames 40 and 41 so that the lateral adjustment of these sub-frames carries the upper die members as well as the upper feed chains and belts.

The various parts of the mechanism may be supported by suitable pedestals, framework, etc. for instance, the slotting cutters are supported by pedestals 120, and the creasing mechanism is supported by framework 121.

Power may be supplied for driving the various parts of the mechanism in any suitable manner, as for instance by electric motor 122. This is shown as driving the upper slotting rollers by means of a chain 123. Chain 124 transmits the power from the shaft 21 to the shaft 74 from which power is transmitted by the gear 75 to the gears 76 and 77 on the cam shafts 80 and 81 previously described. The power is transmitted from the shaft 74 to the shaft 74' through the intermediate shaft 125 and suitable bevel or mitre gears shown in Fig. 2, so that the shafts 74 and 74' rotate at the same speed and in opposite directions and cause the creasing members 72 and 73 to operate in synchronism to grasp, crease, feed and release the sheets.

A clear idea of the successive relative positions of the sheets, slotting cutters and dies during these operations may be derived from Figs. 10, 11, 12 and 13. In these figures the sheets are shown in their relative spaced positions as propelled by the feed belts and chains in the direction of the arrows. The centers of the pins 91, 92, 111 and 112 describe the paths indicated in dash lines in the directions of the arrows thereon. These paths are the result of the combined action of the eccentrics 80, 81, 105 and 107 which cause the dies to approach and recede from each other and of the arms 82, 83, 106 and 108 which move the dies forwardly and rearwardly.

Figure 10:
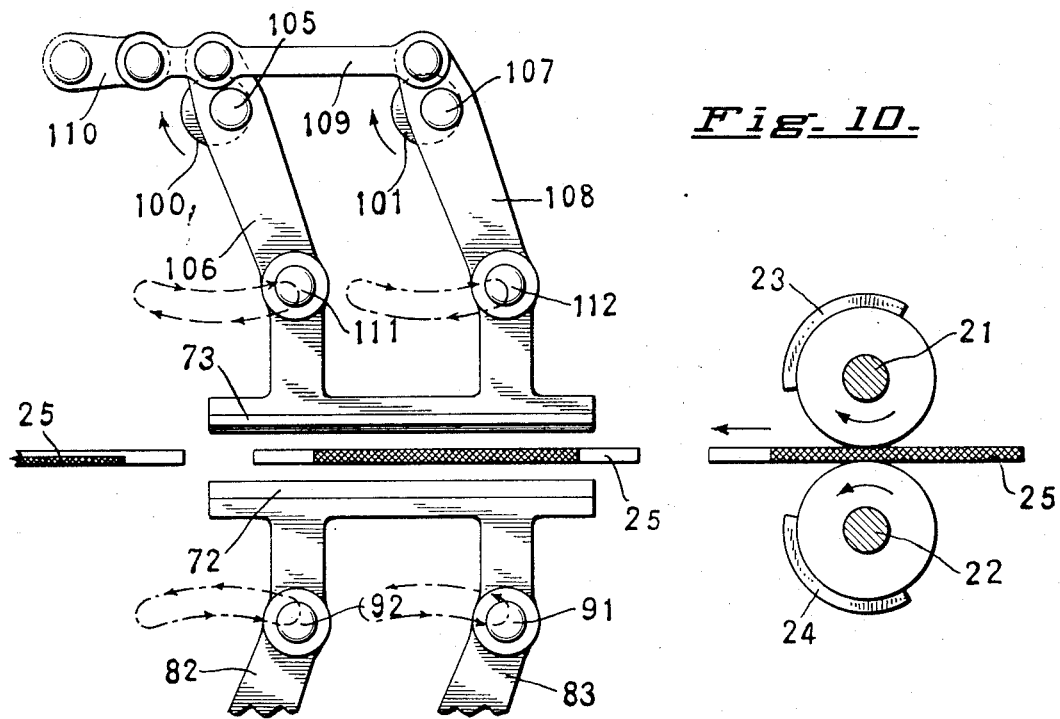
Fig. 10 is a side view and longitudinal section showing diagrammatically the slotting and creasing mechanism, the parts of the latter being shown in the open position ready to receive the slotted blank.

In Fig. 10 the sheet at the extreme left has been creased and is being carried away from the dies. The following sheet is moving into position where it will be grasped by the dies, and a third sheet is passing through the slotting cutters and the advancing edge has been slotted. The dies 72 and 73 are in their extreme forward position and have just started to approach each other. From this point they swing downwardly and rearwardly along the indicated paths until they reach the position shown in Fig. 11.

Figure 11:
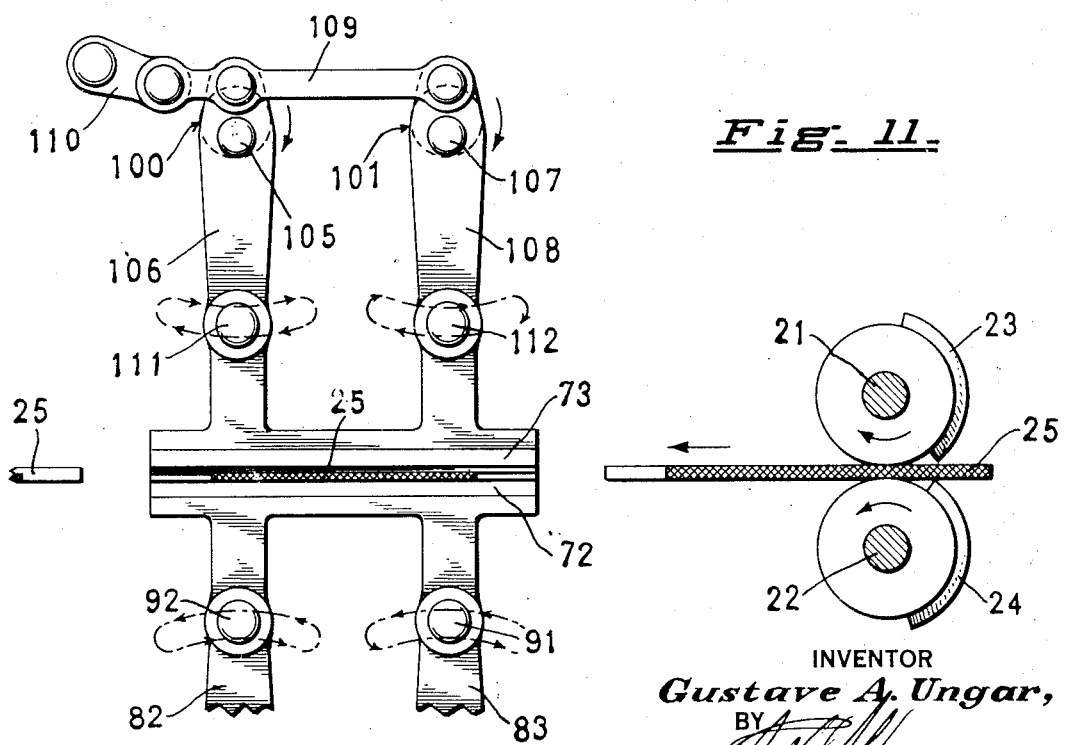
Fig. 11 is a similar view showing the blank at the end of the creasing action with the jaws fully closed.

In Fig. 11 the dies have reached their extreme closed position which brings them in contact with the forward moving sheet which is creased between the die surfaces as the sheet and dies move rearwardly without stopping. The sheet passing through the slotting cutters has reached the point where the slotting of the rear edge is about to occur.

Figure 12:
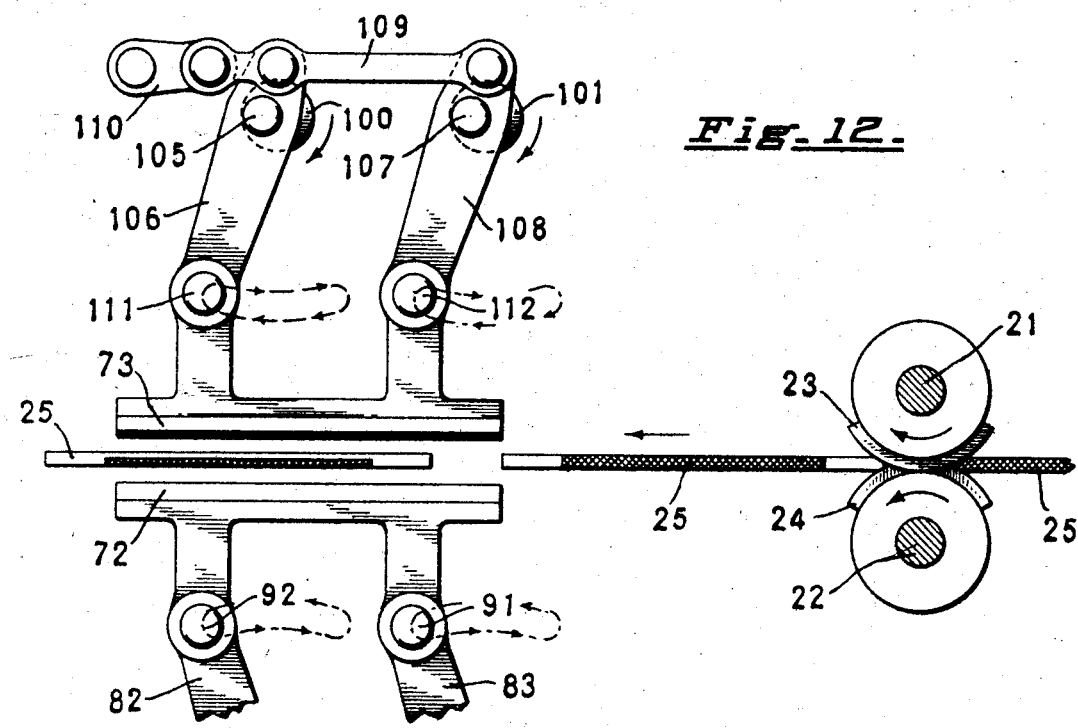
Fig. 12 is a similar view showing the jaws retracted to free the blank and permit it to move away from the jaws.

In Fig. 12 the dies 72 and 73 have separated and moved upwardly to their extreme rear position freeing the creased sheet which is carried forward by the feed chains. The following sheet is shown leaving the slotting cutters and a new sheet is receiving the slotting operation on its advancing edge.

Figure 13:
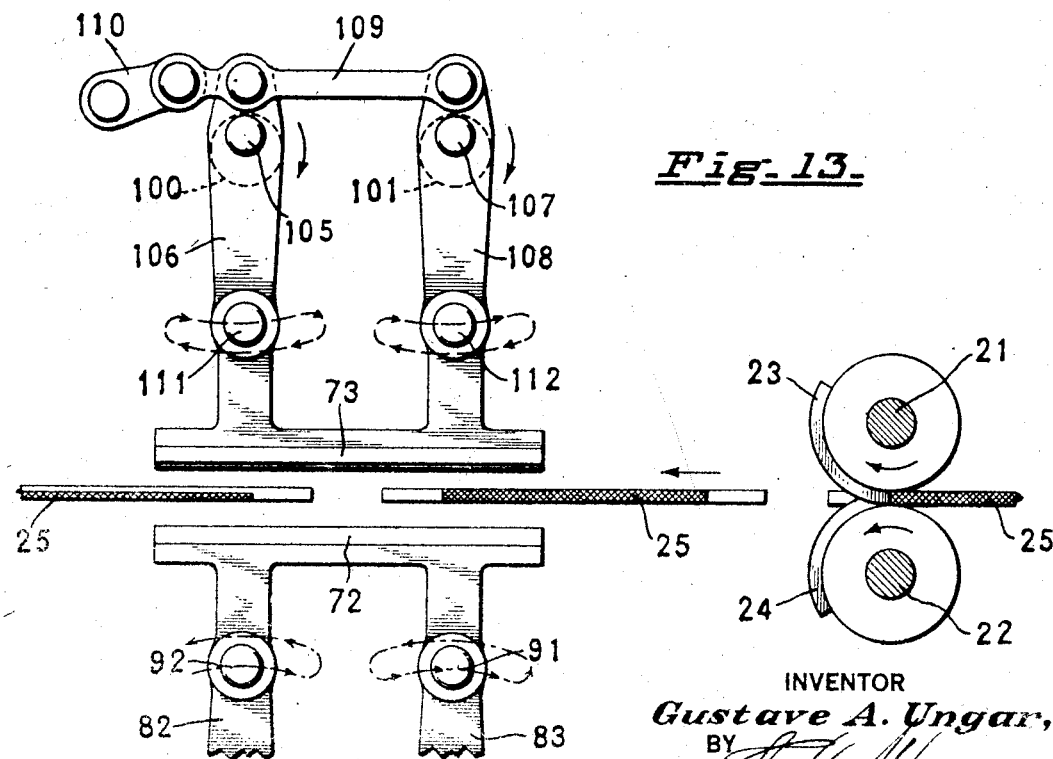
Fig. 13 is a similar view showing the jaws traveling backward preparatory to grasping another blank and showing the creased blank on the way to the folding mechanism.
Figure 14:
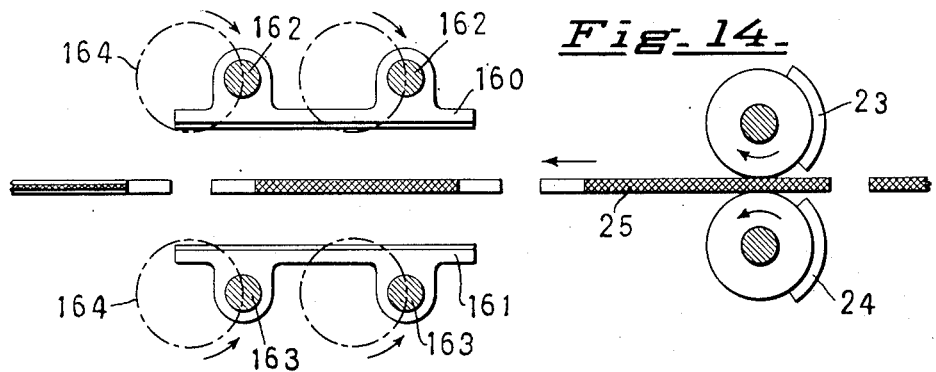
Figs. 14, 15, 16 and 17 are diagrammatic longitudinal sectional views showing the gripping jaws of a modification in the open, fully closed, released and fully retracted positions, respectively.
Figure 15:
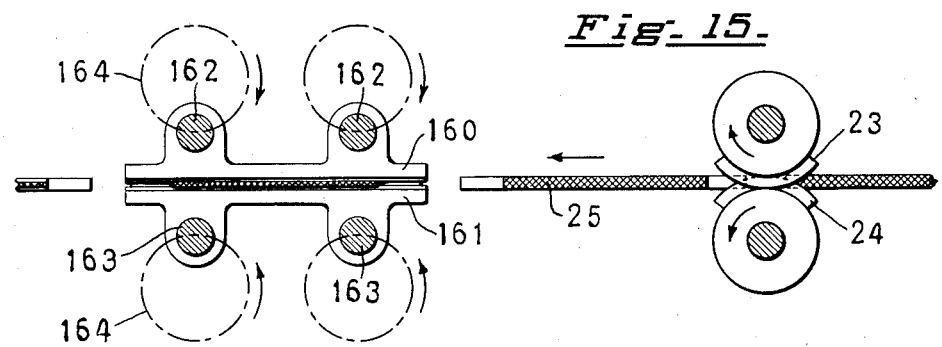
Figure 16:
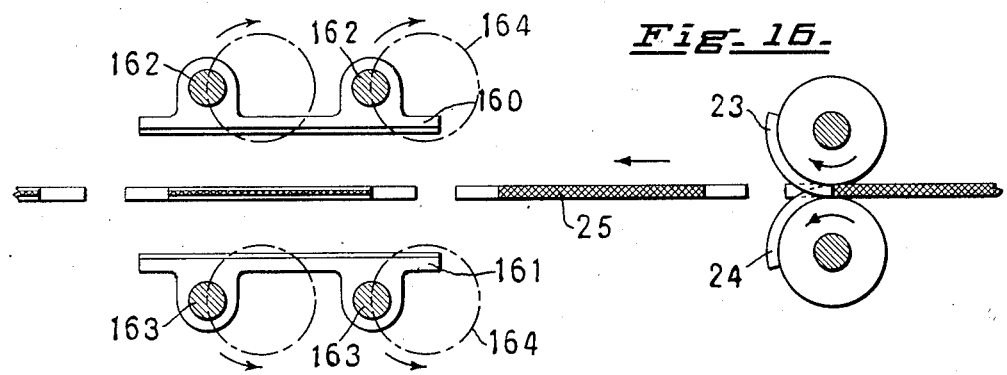
Figure 17:
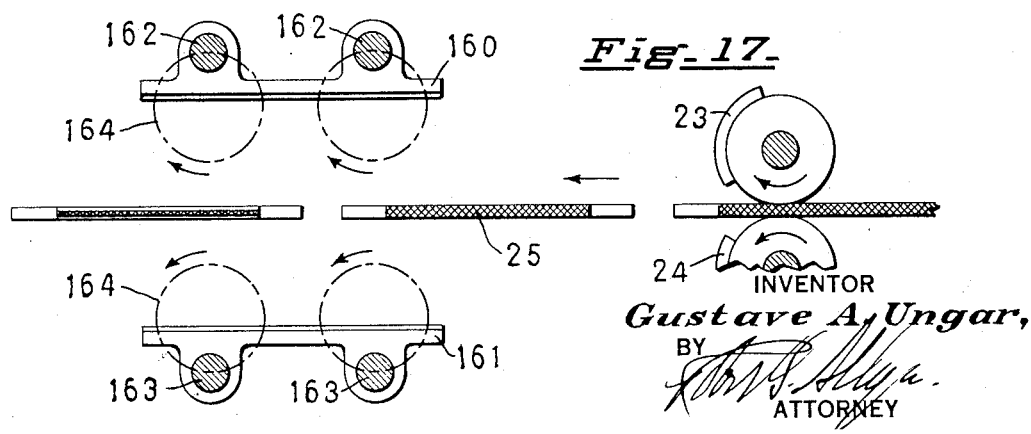

From this point the dies move forward through the position shown in Fig. 13 wherein the creased sheet is being withdrawn further from the dies and the next following sheet is advancing to the creasing position. The new sheet is shown at the end of the slotting operation on its advancing edge and the smooth parts of the slotting cutter rollers are engaging the surfaces of that sheet.

The motion of the dies and sheets then continues to the positions shown in Fig. 10, completing the cycle.

The shaft 38 which drives the feed pulley 32 and the feed sprocket 67, is driven from the shaft 74' through the inclined counter shaft 126 and the bevelled gears as shown in Fig. 4. The pulley 32 drives the upper in-feed belt 30 and the sprocket 67 drives the feed chain 66 as previously described. It will be obvious from the foregoing that the slotting cutters 23 and 24 should be set so as to feed the blanks in proper timed relation to the movement of the feed chain 66 and the creasing dies 72 and 73.

In operation blanks 25 are fed by any suitable mechanism between the shafts 21 and 22 in properly spaced relation to each other so that the cutters 23 and 24 will cut slots of the desired length in the front and rear edges and the trimmers 23' will shear the stock to the desired width.

As each blank emerges from the rolls the forward edge enters between the pairs of feed belts 30 and 31 which frictionally engage the blank. The forward movement of the lower runs of the belts 30 at uniform speed carries the blank toward the creasing dies in a path above the central support 64, between the lateral guide flanges 60 and 61 and below the conveyor chain 66. As the rear edge of the blank emerges from between the belts it is caught and carried forward by two of the carrier stops 70 as they move forward on the lower runs of the chains 66, into position between the creasing dies 72 and 73.

The timing of the mechanism is so arranged that the blank reaches this position just as the dies close. It is seized by them and creased in line with the slots as the blank, dies and carrier continue to move forward at a uniform speed until the dies separate and are retracted from the blank which continues to move forward with the carrier.

The creased blanks are conveyed from the mechanism thus far described by means of a chain 130 which has fingers or flanges 131 arranged at suitable intervals to pick up the blanks as they are delivered by the chains 66 and their fingers 70 previously mentioned.

These creased blanks may be delivered to a suitable table or receptacle or conveyed directly to folding mechanism such as shown in Figs. 5 to 9 inclusive. The creased blanks are supported on the lateral gauges 60 and 61 and conveyed by the chain 130 to rollers such as 132 and 133 which grasp portions of the blank along the edges of its central portion adjacent to the two outer creases. The rollers 134 are inclined with respect to the rollers 132 and 133 so as to bend the edges of the blank 25 as shown in Fig. 6. This bending action is effected gradually by a series of successive rollers such as 134, 135, and 136 in Figs. 5, 6 and 7. The bending may be continued by rollers such as 137, and 138, Fig. 8. The backward bending is continued by rollers 139 and 140 as shown in Figs. 5 and 9. The final bending between rollers 140 and 141 flattens out the creased portions and holds the blanks so that they can be gummed or taped at the meeting edges, either in a continuation of the same machine or in a subsequent process, if desired.

The chains 130 may be supported on flanges 130' along their lower edges to prevent them from touching the blanks. The upper runs of the chains may be supported in any suitable manner, as for instance, by rollers or sprockets 150 so as to prevent them from sagging.

The various folding rollers may be mounted so that they can be individually adjusted with respect to their angles of inclination, as for instance, by mounting them upon shafts or hinges such as 142 in Fig. 6. They may also be adjusted laterally, for instance, by supporting them on brackets 143 which slide on transverse rods 144 and 145. Lateral movement of the brackets and rollers may be effected by rotation of screw shafts 146 which operate in threaded portions of the brackets 143. These supporting brackets are made up of longitudinal portions 143 and hangers 148. The longitudinal beam-like members 143 are adjusted laterally by the screw shafts 146 and the hangers 148 are adjustable longitudinally of the beams 143 so as to change the points at which the bending action takes place. One edge may be adjusted in one direction by screw shafts 146 and the rollers along the other edge may be adjusted in the opposite direction by screw shafts 146' (see Figs. 8 and 9).

The lower rollers such as 133 are supported by brackets 149 and adjustable in a manner similar to the upper brackets previously described.

It will be understood, of course, that the lateral position of the folding rollers can be adjusted simultaneously with the lateral adjustment of the creasing mechanism so that the lines of folding will coincide or correspond with the lines of creases initially formed in the blanks.

The central portion of the blank may be supported by a guide 151, arranged between the opposite folding rollers.

The folded blanks may be delivered on to a suitable delivery table 152, or carried away by another conveyor to any desired point.

In the modification shown in Figs. 14 to 17 the blanks 25 are slotted by cutters 23 and 24 and fed to the creasing dies 160, 161, which are mounted on studs 162 and 163 which are organized to rotate on eccentrics whose center lines are indicated at 164. This construction is somewhat simpler than the form first described and might be more suitable for smaller types of blanks where the time of feed is less. The length of feed of the blank during one cycle of the creasing action is obviously limited by the diameter of the circle 164 so that such a mechanism for large sized blanks would mean a considerable increase in the overall height of the machine and corresponding increase in weight and cost. Figs. 14, 15, 16 and 17 show the successive positions of the creasing dies with respect to a blank and the successive blanks being fed to the creasing dies from the slotting cutters. It should be understood that the feeding, guiding and supporting mechanism might be the same as previously described.

Figure 18:
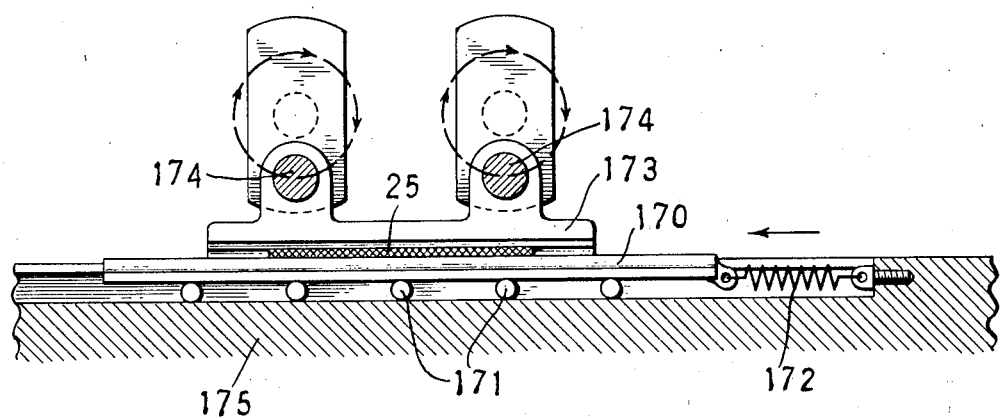
Fig. 18 is a diagrammatic longitudinal sectional view of another modification of the creasing mechanism with the creasing jaws in closed position.
Figure 19:
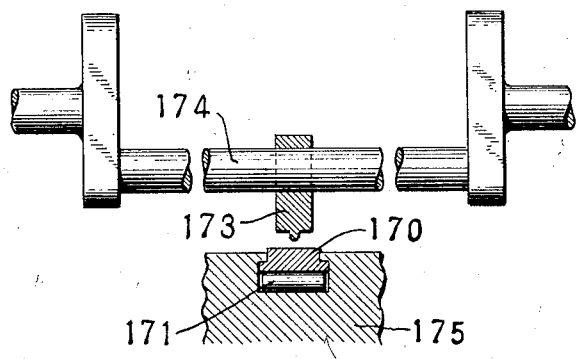
Fig. 19 is a transverse sectional view of the parts shown in Fig. 18.

In the construction shown in Figs. 18 and 19 the lower creasing die 170 is supported on a series of rollers 171 and is under tension of a spring 172 which tends to move or hold the die 170 toward the in-feeding end of the machine. The upper creasing die 173 is supported by two crank pins 174 by which the upper creasing die is given a swinging movement similar to the creasing movement of the form shown in Figs. 14 to 17. When the upper creasing die engages the blank 25 it presses it against the lower die 170 and carries it together with the lower creasing die forwardly by friction until the pressure is released sufficiently to permit the spring 172 to draw back the creasing die 170 to its normal position of rest ready to receive a new blank. It will be obvious that a conveyor such as 66 may be employed with this mechanism to produce a continuous feeding action of the blanks. It should also be understood that the upper die creasing mechanism shown in Fig. 1 might be employed with a sliding lower die such as 170.

The dies 170 are supported in members 175 which may be adjustable laterally in a manner similar to the lateral adjustment of the other creasing members heretofore described. Similarly the creasing dies 173 may be adjusted laterally on the crank pins 174. It should also be understood that the gripping surfaces of the creasing dies may be designed to produce any desired sectional form of crease dependent upon the material of the blank and the nature of the fold desired. The degree or depth of crease may be controlled by proper design of machine or adjustment vertically of the respective creasing dies.

It should also be understood that other changes and details of construction and methods of operation may be made without departing from the spirit or scope of my invention as expressed in the accompanying claims.

One of the principal advantages of the invention herein set forth is the fact that the creases formed by the dies are perfectly straight and parallel with respect to each other so that the blanks can be folded accurately. This ensures rapidity of operation and uniformity of result and avoids the great waste of material which occurs where roller creases are provided. These improvements also ensure continuous operation without the interruptions occasioned by the necessity of removing broken and jammed stock since the blanks are at all times held in a single plane with flat supports and longitudinally extending members above the blanks while they are being creased.

I claim:

1. In a creasing machine, creasing bars, a number of crank shafts, arms connecting said crank shafts with said bars, a link connecting said arms and means for oscillating said link.

2. In a creasing machine, oscillating creasing bars, a feeding chain having sheet engaging lugs timed to synchronize with the movement of the bars.

3. In a creasing and folding machine, means for feeding sheets into the machine, oscillating creasing bars co-acting with the sheets in the machine, means for feeding the sheets away from the creasing bars and folding means co-acting with the edges of the sheets and the surfaces of the sheets after they leave the creasing bars.

4. In a box blank forming machine cutters for slotting sheets, means for feeding the sheets away from the slotting cutters, oscillating creasing bars, edge folding devices, and means for driving all of said mechanism in synchronism to successively slot, crease and fold successive sheets.

5. A creasing machine comprising feeding devices for slotted sheets, creasing bars arranged longitudinally of the machine and means for moving said creasing bars transversely with respect to the movement of said feeding devices.

6. In a creasing machine, creasing bars, a pair of shafts having eccentric members serving as cranks, arms connecting said members with said bars and means for moving said bars in a longitudinal direction in the relation to said shafts.

7. In a creasing machine, creasing bars, eccentrically operated members for oscillating said bars, arms connecting said members with said bars, framework comprising housings and connecting bars, said housings being adjustable transversely and said connecting bars coacting with said arms to guide said creasing bars in transversely parallel spaced relation each from the other throughout their oscillating movement.

8. In a creasing machine, oscillating creasing bars, longitudinally extending frames for guiding said bars and transverse guides for supporting said frames and permitting their adjustment transversely of the machine.

9. In a creasing machine, oscillating creasing bars, longitudinally extending frames for guiding said bars and transverse guides for supporting said frames and permitting their adjustment transversely of the machine and conveyors supported by and movable transversely with said frames.

10. In a box blank forming machine, a series of cutters for slotting sheets, means for feeding sheets successively away from the slotting cutters, supporting devices adapted to travel with the sheets and to serve as abutments for sheets received from the feeding means, oscillating creasing bars arranged above the sheets, means for moving said bars into engagement with sheets to crease the sheets in line with the slotting cutters and moving the creasing bars forwardly with the sheets and the supporting means and feeding chains having sheet engaging lugs synchronized to move with the sheets as they travel with the creasing bars and to remove the sheets from the suporting means when the sheets have been released by the creasing bars.

11. In a creasing machine, a series of sheet supporting members spaced apart from each other transversely of the machine and mounted to move longitudinally, creasing bars mounted above the supporting means, means for oscillating said creasing bars so as to move them into creasing engagement with sheets on said supporting means and forwardly with the sheets and the supporting means, and then raising the bars from the sheets, a plurality of longitudinally extending feeding chains having sheet engaging lugs and means for driving said chains so as to pick up the successive sheets and carry them away from the supporting means.

GUSTAVE A. UNGAR.